(12) United States Patent
Cooley

(10) Patent No.: US 8,594,711 B2
(45) Date of Patent: Nov. 26, 2013

(54) SYSTEMS AND METHODS FOR REMOTELY CONTROLLING AND CUSTOMIZING APPLICATIONS RESIDENT ON A MOBILE DEVICE

(75) Inventor: James W. Cooley, Seattle, WA (US)

(73) Assignee: Zumobi, Inc., Seattle, WA (US)

( * ) Notice: Subject to any disclaimer, the term of this patent is extended or adjusted under 35 U.S.C. 154(b) by 899 days.

(21) Appl. No.: 12/327,684

(22) Filed: Dec. 3, 2008

(65) Prior Publication Data

US 2012/0208568 A1 Aug. 16, 2012

(51) Int. Cl.
*H04W 4/00* (2009.01)
(52) U.S. Cl.
USPC ............... 455/466; 455/412.1; 455/412.2; 455/70; 709/206; 709/207; 700/90
(58) Field of Classification Search
USPC ............ 455/412.1, 412.2, 466, 70; 700/90; 709/206–607
See application file for complete search history.

(56) References Cited

U.S. PATENT DOCUMENTS

| | | | |
|---|---|---|---|
| 2002/0188676 A1* | 12/2002 | Iai et al. | 709/203 |
| 2007/0073665 A1* | 3/2007 | Naganuma et al. | 707/3 |
| 2007/0173268 A1* | 7/2007 | Le Bodic et al. | 455/466 |
| 2008/0274723 A1* | 11/2008 | Hook et al. | 455/419 |
| 2010/0113072 A1* | 5/2010 | Gibson et al. | 455/466 |

\* cited by examiner

*Primary Examiner* — Khalid Shaheed
(74) *Attorney, Agent, or Firm* — Fulbright & Jaworski LLP

(57) ABSTRACT

Systems and methods are provided that allow an application residing on a user device to intercept messages directed to that device and to extract control information and/or data from the intercepted messages for use by the application. In one embodiment, the intercepted message can cause the application to change its configuration or to present information to the user that came from a sending website. In another embodiment, a message from a device can trigger a website to send back a desired piece of data. The returned data may contain a flag, which directs the data to a formatting server. The formatting server then converts the data into a format that allows the data to be intercepted by the desired application on the user device. This then allows the desired data to be presented to the user in the context of an application resident on the user's device.

19 Claims, 3 Drawing Sheets

SYSTEMS AND METHODS FOR REMOTELY CONTROLLING AND CUSTOMIZING APPLICATIONS RESIDENT ON A MOBILE DEVICE

TECHNICAL FIELD

This disclosure relates to the control and customization of applications resident on a wireless device from locations remote therefrom and more specifically to systems and methods for allowing applications resident on a mobile device to be controlled using the text messaging capability of the wireless network.

BACKGROUND OF THE INVENTION

Electronic device-based applications, particularly wireless device based applications, allow users to request information from various sources to be delivered to the device. However, the returned information is transient in nature in that it can not be stored in a manner that allows the content of the returned information to be used other than for display or modified by a sender or trusted third party. A particular problem is that the returned information cannot later be addressed for content.

Another problem results from the fact that wireless device protocols are typically arranged such that the user must request information and such that information cannot be easily "pushed" to the device using standard Hyper Text Transfer Protocol (HTTP) network protocols. Thus, it is difficult to externally trigger from a remote location an application that resides on a particular device to perform a function.

By way of example, assume a user makes a reservation from his/her cellular telephone for a flight to Las Vegas. When that flight is confirmed, it would be nice to have the particulars of the flight posted in the user's calendar application. At some point in the future, the user will want to know the gate information and the flight status. Using existing HTTP protocols it is impractical to integrate messages sent from the server into the user's applications. Certainly, the user can receive a text (SMS) message or an email message, but those messages are stand-alone messages and their content is not in a format that can be readily used other than for display purposes.

BRIEF SUMMARY OF THE INVENTION

Systems and methods are provided that allow an application residing on a user device to intercept messages directed to that device and to extract control information and/or data from the intercepted messages for use by the application. In one embodiment, the intercepted message can cause the application to change its configuration or to present information to the user that came from a sending website. In another embodiment, a message from a device can trigger a website (such as an airline website) to send back a desired piece of data. The returned data can, for example, contain a flag, which directs the data to a formatting server. The formatting server then converts the data into a format that allows the data to be intercepted by the desired application on the user device. This then allows the desired data to be presented to the user in the context of an application resident on the user's device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
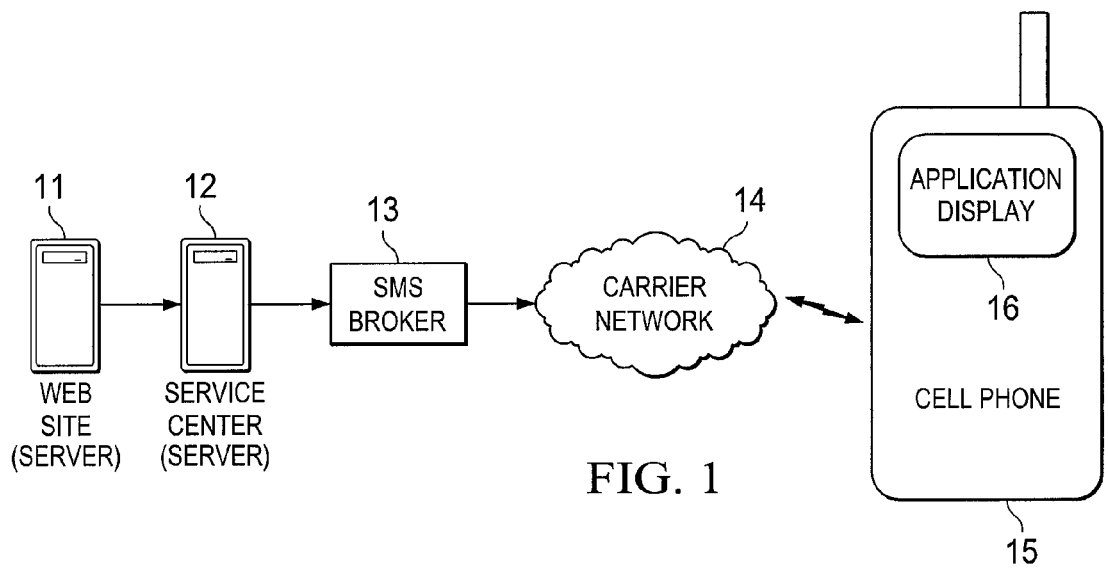
FIG. 1 shows one embodiment of a system in which the concepts of the invention can be practiced.

FIG. 1 shows one embodiment of a system, such as system 10, in which the concepts of the invention can be practiced. In FIG. 1 there is shown a link from a user device, such as cellular telephone 15 to website 11. This link extends from the user device through a carrier network, such as network 14 and via service center 12 to the desired website. The message returned from website 11 contains an HTTP request against service center 12. The service center then queues a Short Message Service (SMS) message back to device 15 through an SMS broker, such as broker 13. Broker 13 then routes an SMS message through any carrier network, such as network 14, which need not be the same network that was used for the originating message from the device.

An SMS message, also referred to as a text message, is a service for sending short messages of up to 160 characters (224 characters if using a 5-bit mode) to mobile devices, including cellular phones and PDAs. SMS messages do not require the mobile phone to be active and within range and the message will be held for a number of days until the device is active and within range. SMS messages are transmitted within the same cell or to anyone with roaming service capability.

When the incoming text message arrives at the user's device it is intercepted, under control of the device processor and an application, such as application 31 (as will be discussed), running on the device. This is possible because application 31 is registered with the device operating system when it was loaded on the device. Application 31 then routes the incoming message to the proper specific application in accordance with the data contained in the text message. Thus, in the situation with the flight reservation to Las Vegas (as discussed above), information pertaining to that flight is routed to a specific application, such as to air travel application 22-1 (shown in FIG. 2B), which application is dedicated to air travel data pertaining to the device user.

Figure 2A:
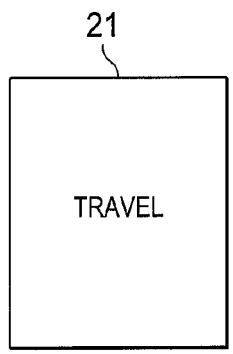
FIGS. 2A through 2F show one example of an environment in which the concepts of this invention can be used.
Figure 2B:
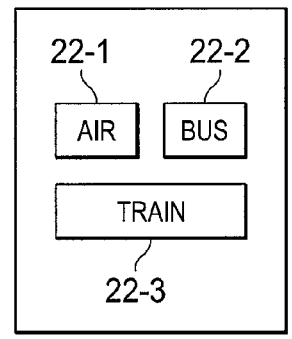
Figure 2C:
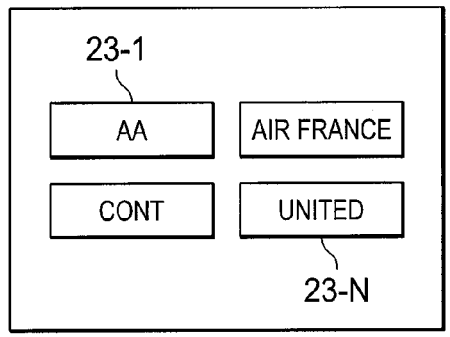
Figure 2D:
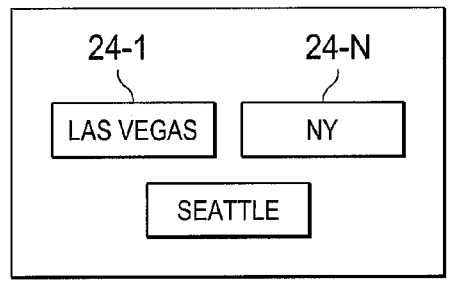
Figure 2E:
Figure 2F:

FIGS. 2A through 2F by way of example, show one environment, called a tiled environment, in which the concepts of the invention can be used. In such an environment, the device may have on it a number of "tiles" displayed on a screen. Each tile pertains to a particular subject matter. Thus, assuming the user has such a tile-based system on his/her device, the user would, for example, touch TRAVEL tile 21 as shown in FIG. 2A. This then would bring up the display shown in FIG. 2B where the user is given a selection of options 22-1 through 22-N. When the user touches AIR tile (preferably a soft button) 22-1 the options shown in FIG. 2C appear. Here the user is given a choice of the airlines he/she has pre-selected.

When the user touches tile 23-1 all the flights that the user has booked on, for example, AMERICAN™ airlines (AA) are displayed. Touching tile 24-1 then yields the screen shown in FIG. 2E which then displays the information that has been received from an external source. In this case this information would have come typically from the AA server in the manner discussed above. There could be any amount of information and tiles (or layers) to this information, all controlled by application 30 residing on the user's device with the updated information coming, from time to time, via messages from various external locations. Note that in FIG. 2F the gate and status of the flight have been updated. This update could have come as a result of a request from the user or could have come as a text message from the airline as part of an update service for customers. In any event, the message would have gone first to service center 12 and then via SMS broker 13 to the user's device where application 30 would have taken the data and placed it in the proper tile.

Figure 3:
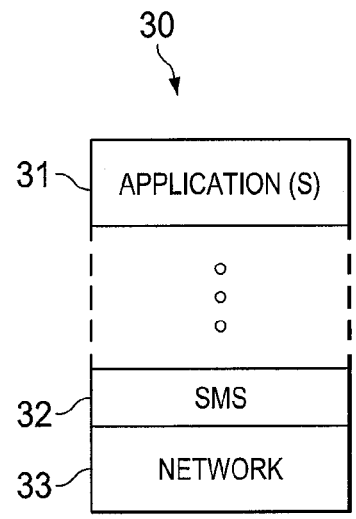
FIG. 3 shows one embodiment of system for controlling messages on a user device.

FIG. 3 shows one embodiment of a system for controlling messages on a user device. The incoming SMS message would normally be delivered to level 32 of network stack 30 for subsequent display to device user via, for example, display 16 (FIG. 1). The display would be in text or visual form and would then go into the SMS box in text, graphics or video form as is well-known. However, application 31 intercepts the message because that application is registered with the platform to receive certain SMS messages. This protocol varies from device to device based on operating system. SMS or HTTP transports can be used via the side channel process. SMS has the advantage of being a true "push" notification. Application 31 then routes the incoming message, based on the context and content of the data contained in the message to an individual tile, such as to tile 22-1 (FIG. 2B) or even more specifically to tile 24-1 (FIG. 2D), as discussed above.

The SMS message contains envelope information which includes the phone number to which it is destined, and in this case would include additional routing information to route it to application 31 so that the message does not get stored in the message box so the message will not be text formatted. Thus the system takes advantage of a feature that allows SMS messages to be addressed to internal applications. The application address is added at the service center 12, or if desired could be added by the sender if the application address is made known to the sender. This could, for example, be accomplished by registering the address with the website in advance.

Another method for doing this would be to run a Simple Mail Transfer Protocol (SMTP) gateway at service center 12. This would allow application 31 to receive incoming messages in email form. Such email messages could then be parsed to see if they contain certain information, such as the tile ID, etc. This approach would benefit from a fixed format email message. The parsing includes filtering the email messages to see if they contain certain information. The filtered information then would be sent to the device by an SMS message. Second, the formatted SMS message could be sent to the service center for delivery to the particular user device.

Figure 4:
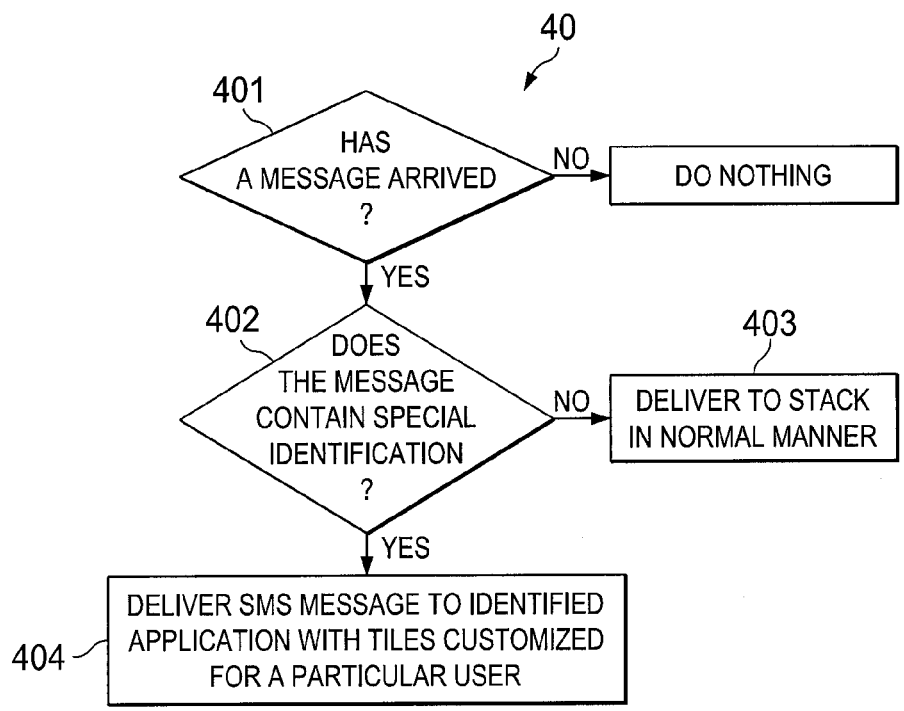
FIG. 4 shows one embodiment of a flow chart of system operation.

FIG. 4 shows one embodiment of a method, such as method 40, for controlling applications resident on a mobile device from a remote location. Process 401 determines if a message is incoming to a particular device. If there is a message available, then process 402 determines if the message contains any code or data that identifies the message as one that is to be delivered to a specific application resident on the device and/or delivered customized in a particular manner. If not, then the message is stored in its normal location, for example in SMS layer 32 (FIG. 3) and delivered without modification.

If the message does contain a "diversion" code or other data that indicates that the message is to be delivered to another location or delivered in a customized manner, then process 404 delivers the incoming message (or other data) accordingly as discussed above, such that a particular user's tile is customized for a particular application. Customizing could, for example, include one or more of the following: appearance, context, display parameters, including audio, visual, application state change. In some situations, a control command is sent to a user's tile, for example, using an SMS transport protocol such that the command controls the display parameters and/or the display message instead of actual text being sent to the tile.

When implemented via computer-executable instructions, various elements of embodiments of the present invention are in essence the software code defining the operations of such various elements. The executable instructions or software code may be obtained from a readable medium (e.g., a hard drive media, optical media, RAM, EPROM, EEPROM, tape media, cartridge media, flash memory, ROM, memory stick, and/or the like). In fact, readable media can include any medium that can store information.

Figure 5:
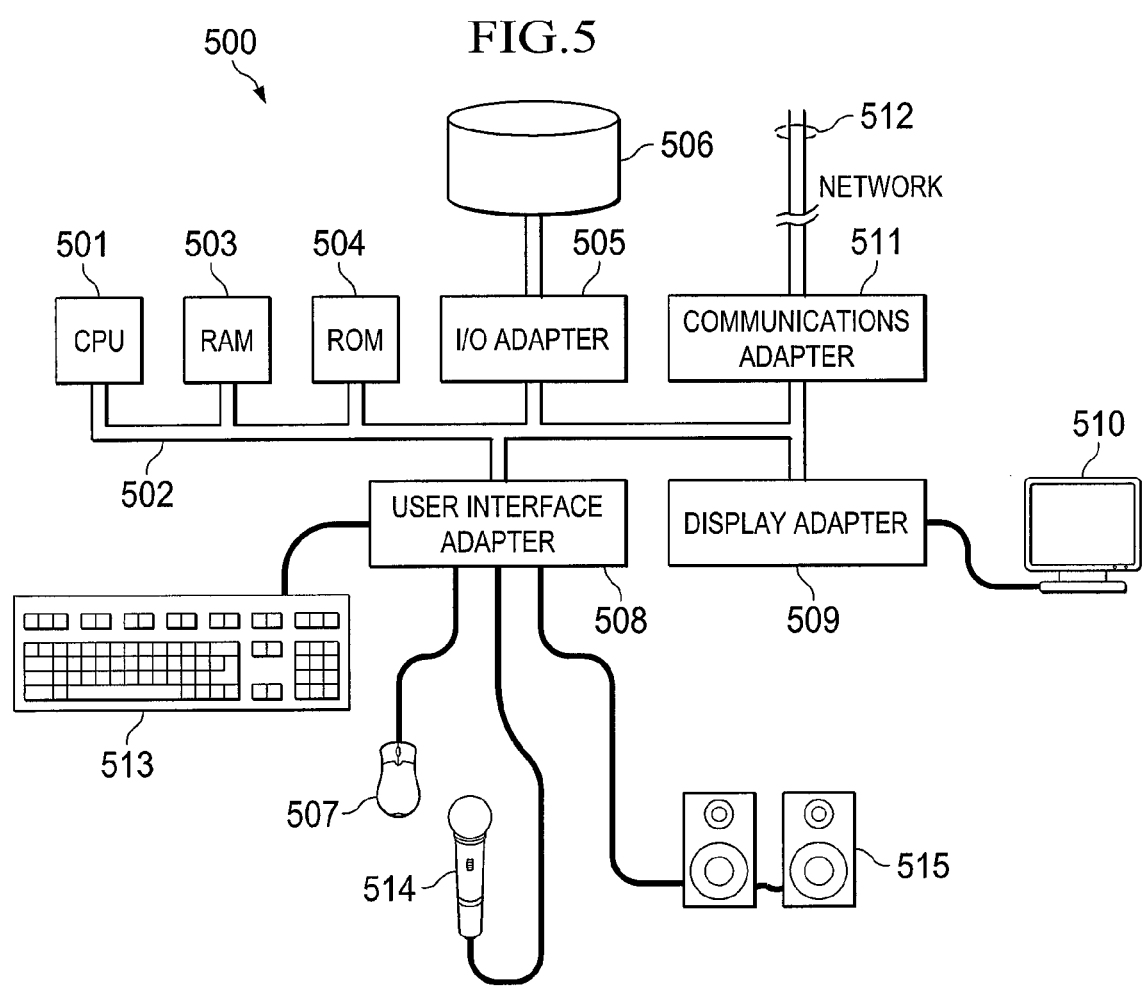
FIG. 5 shows an example computer system adapted according to one embodiment of the present invention.

FIG. 5 illustrates an example computer system 500 adapted according to one embodiment of the present invention. That is, computer system 500 comprises an example system on which embodiments of the present invention may be implemented (such as servers 11, 12, broker 13, and handheld device 15 of the example implementation of FIG. 1). Central processing unit (CPU) 501 is coupled to system bus 502. CPU 501 may be any general purpose or specialized purpose CPU. However, the present invention is not restricted by the architecture of CPU 501 as long as CPU 501 supports the inventive operations as described herein. CPU 501 may execute the various logical instructions according to embodiments of the present invention. For example, one or more CPUs, such as CPU 501, may execute machine-level instructions according to the exemplary operational flows described above in conjunction with FIG. 4.

Computer system 500 also preferably includes random access memory (RAM) 503, which may be SRAM, DRAM, SDRAM, or the like. In this example, computer system 500 uses RAM 503 to cache messages that have arrived. Computer system 500 preferably includes read-only memory (ROM) 504 which may be PROM, EPROM, EEPROM, or the like. RAM 503 and ROM 504 hold user and system data and programs, as is well known in the art.

Computer system 500 also preferably includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information, such as media selections.

I/O adapter 505 preferably connects to storage device(s) 506, such as one or more of hard drive, compact disc (CD) drive, floppy disk drive, tape drive, etc. to computer system 500. The storage devices may be utilized when RAM 503 is insufficient for the memory requirements associated with storing media data. Communications adapter 511 is preferably adapted to couple computer system 500 to network 512 (e.g., the Internet, a LAN, a cellular network, etc.). User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, display the screens shown in FIGS. 2A-F.

While FIG. 5 shows a purpose computer, it should be noted that the exact configuration of a portion of a system according to various embodiments may be slightly different. For example, handheld devices according to one or more embodiments may be any kind of processor-based device, such as a cell phone, a Personal Digital Assistant, a specialized device, and/or the like. Additionally, servers (e.g., servers 11, 12 of FIG. 1) and the SMS broker according to one or more embodiments may be any kind of processor-based device capable of sending messages (e.g., email messages, SMS messages, MMS messages), such as a personal computer, a server-type computer, and the like. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for retrievably storing data on a mobile device; said method comprising:
   receiving said data at said mobile device, said data being part of an SMS message sent to said mobile device via a wireless protocol, wherein a SMS layer on said mobile device normally receives SMS messages for subsequent display on said mobile device;
   automatically intercepting the SMS message by a pre-stored application that is preregistered to receive certain SMS messages and directing said data to the application pre-stored on said mobile device, said directing controlled, at least in part based on information contained within said SMS message; and
   storing said data under retrievable control of said application;
   wherein said SMS message contains envelope information including routing information that contains a diversion code;
   wherein, the diversion code routes the SMS message to said pre-stored application, said pre-stored application corresponding to a tile of a displayed plurality of tiles on said mobile device, so that said SMS message does not get stored in a SMS message box and will not be text message formatted;
   wherein further, the diversion code indicates the SMS message is to be delivered in a customized format for use in updating said pre-stored application, wherein said updating includes customizing said pre-stored application with respect to one or more of the following: appearance, context, display parameters, audio, visual and application state change.

2. The method of claim 1 further comprising:
   presenting at least a portion of said data to a user of said device, said presenting occurring under at least partial control of said application.

3. The method of claim 1 further comprising:
   gathering data for storage, said stored data for subsequent presentation to a user, said data gathered from any of a number of locations remote from said mobile device via individual SMS messages.

4. The method of claim 3 wherein said application retrieves selected information from said storage for presentation to said user, said retrieving depending upon commands received from a user of said device.

5. A system for controlling presentation of information to a user of a mobile device; said system comprising:
   a server for sending information corresponding to a particular application to said user at said mobile device;
   an intermediary for incorporating at least a portion of said information corresponding to the particular application into a text message addressed to said device; and
   means at said device for automatically intercepting messages from said intermediary away from a text messaging program and to direct the messages to the particular application pre-loaded on said device;
   a display screen on the mobile device containing a plurality of tiles, wherein a particular one of said plurality of tiles pertains to the particular application;
   wherein said text message contains envelope information including routing information that contains a diversion code;
   wherein, the diversion code routes the text message to the particular application, so that the text message does not get stored in a message box and will not be text message formatted;
   wherein further, the diversion code indicates the text message is to be delivered in a customized format for use in updating said particular application, wherein said updating includes customizing said particular application with respect to one or more of the following: appearance, context, display parameters, audio, visual and application state change.

6. The system of claim 5 further comprising:
   a processor for receiving commands from said user; said commands directing said application to present to said user at least portions of said directed messages.

7. The system of claim 6 wherein said presenting is incorporated into said plurality of tiles operating on said mobile device.

8. The system of claim 5 further comprising:
a processor for controlling said application to perform a function controlled, at least in part, by said directed messages.

9. The system of claim 8 wherein said function is selected from the list of:
controlling data presentation to said user; customizing appearance; customizing content; customizing display parameters.

10. A computer program product having a non-transitory computer readable medium having computer program logic recorded thereon for updating information on a mobile device, said computer program product comprising:
code for establishing on said device a cache for the storage of information pertaining to one or more applications;
code for communicating to at least one server a desire to receive information from time to time pertaining to a particular one of said applications;
code for receiving into said cache from said server from time to time messages containing said information pertaining to said particular application, said messages selected from a list consisting of:
Short Message Service (SMS) messages;
Multimedia Messaging Service (MMS) messages; and
email messages;
wherein said messages are normally sent to a layer on said mobile device for display on said mobile device, wherein said particular application is registered with the mobile device to be able to automatically intercept certain ones of said messages for the particular application, and wherein said certain ones of said messages comprise data indicating said certain ones of said messages should be delivered to said particular application;
code for receiving from said user a command for presenting to said user information on a requested application; and
code for presenting to said user, in response to a received command, said cached received information pertaining to said requested application;
wherein said certain ones of said messages contain envelope information including routing information that contains a diversion code;
wherein, the diversion code routes said certain ones of said messages to the particular application, so that said certain ones of said messages do not get stored in a message box and will not be text message formatted;
wherein further, the diversion code indicates said certain ones of said messages are to be delivered in a customized format for use in updating said particular application, wherein said updating includes customizing said particular application with respect to one or more of the following: appearance, context, display parameters, audio, visual and application state change.

11. The computer program product of claim 10 wherein said messages are received using SMS messaging capability of a wireless network.

12. The computer program product of claim 11 wherein said receiving into said cache comprises:
an application registered with said mobile device such that said messages are delivered to said particular application instead of being delivered to a text message cache in accordance with SMS protocol.

13. The computer program product of claim 12 wherein said code for command receiving comprises:
code for presenting to said user tiled choices, allowing said user to drill downward through said tiles to refine said user request.

14. The computer program product of claim 11 further comprising:
code for directing data pertaining to a particular subject matter from a server to an intermediary location for subsequent delivery to said device.

15. The computer program product of claim 14 wherein said intermediary device reformats at least a portion of said data from said server.

16. The computer program product of claim 15 further comprising:
code for sending said reformatted data to an SMS broker for delivery to said device.

17. The computer program product of claim 15 further comprising:
code for sending a command to a tile for controlling display parameters to a user.

18. The computer program product of claim 17 wherein said command is sent via an SMS transport protocol.

19. The method of claim 1 wherein the intercepted SMS message is not displayed on a resident SMS program.

* * * * *